(12) United States Patent
Halilah (10) Patent No.: US 8,201,457 B1
(45) Date of Patent: Jun. 19, 2012

(54) FLUID MEASURING DEVICE

(75) Inventor: Sami O. Halilah, Stafford, TX (US)

(73) Assignee: Dynamic Flow Computers, Inc., Stafford, TX (US)

( * ) Notice: Subject to any disclaimer, the term of this patent is extended or adjusted under 35 U.S.C. 154(b) by 85 days.

(21) Appl. No.: 12/949,673

(22) Filed: Nov. 18, 2010

Related U.S. Application Data (60) Provisional application No. 61/282,282, filed on Jan. 13, 2010.

(51) Int. Cl.
*G01L 7/00* (2006.01)
*G01F 1/00* (2006.01)
(52) U.S. Cl. ............................................. 73/756; 73/861
(58) Field of Classification Search ........................ None
See application file for complete search history.

(56) References Cited

U.S. PATENT DOCUMENTS

| | | | |
|---|---|---|---|
| 4,637,756 A * | 1/1987 | Boles | 405/184 |
| 4,638,672 A | 1/1987 | McCall | |
| 4,703,664 A * | 11/1987 | Kirkpatrick et al. | 73/866.5 |
| 4,753,111 A * | 6/1988 | Caron et al. | 73/204.14 |
| 4,812,049 A | 3/1989 | McCall | |
| 5,363,699 A | 11/1994 | McCall | |
| 5,571,970 A * | 11/1996 | Mutoh et al. | 73/724 |
| 5,814,738 A | 9/1998 | Pinkerton et al. | |
| 7,500,405 B2 | 3/2009 | McCall et al. | |
| 2002/0100316 A1* | 8/2002 | James et al. | 73/204.26 |

* cited by examiner

*Primary Examiner* — Andre Allen
(74) *Attorney, Agent, or Firm* — Buskop Law Group, PC; Wendy Buskop (57) ABSTRACT

A fluid measuring device having a hollow body, a conical section mount, a support member, and a sensor mount as a single cast unit. The hollow body can have an exterior surface, an interior surface, and a chamber. The fluid measuring device can be connected to one or more conduits for receiving and emitting a fluid flow. The sensor mount can have ports for measuring pressure, temperature, and other diagnostics in the single cast unit. The fluid measuring device can have a detachable and re-attachable area ratio changer.

20 Claims, 7 Drawing Sheets

FLUID MEASURING DEVICE

CROSS REFERENCE TO RELATED APPLICATIONS

The present application claims the benefit of and priority of co-pending U.S. Provisional Patent Application Ser. No. 61/282,282 filed on Jan. 13, 2010, entitled "Fluid Measuring Device", which is incorporated herein in its entirety.

FIELD

The present embodiments generally relate to a fluid measurement device that can be a single cast unit having a plurality of ports for measurement instrumentation, a self-centered and self-aligned conical section mount with an integral support member, and a detachable and re-attachable area ratio changer.

BACKGROUND

A need exists for a rugged and reliable fluid measurement device.

A need exists for a fluid measurement device with a conical section mount that is self-centered and self-aligned.

A need exists for a fluid measurement device having a hollow body, a conical section mount, and a support member, all as a single cast unit.

A need exists for a fluid measurement device with a detachable and re-attachable area ratio changer allowing for replacement and maintenance without affecting the alignment of the conical section mount within the hollow body.

A need exists for a fluid measurement device that has a temperature port for recording temperature at the optimal location proximate the pressure measurements without disrupting fluid flow.

A further need exists for a fluid measurement device having an additional port for diagnostics and monitoring that is downstream from the other ports to avoid contamination of the primary measurement instruments.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a fluid measuring device, which can be a cone type meter. The fluid measuring device can be a reliable and consistent metering device for measuring flow characteristics and other fluid characteristics.

The fluid measuring device can be used to acquire accurate data of fluid parameters. For example, the fluid measuring device can be used to acquire fluid parameter data associated with the flow of oil through a pipe, natural gas through a pipe, or another fluid flow. Fluid, as the term is used herein, can include liquids, gases, other media, or combinations thereof. The fluid measuring device can be configured to provide enhanced reliable data collection of fluid characteristics.

The fluid parameter data acquired using the fluid measuring device can be used to monitor flow characteristics of a fluid, which can provide users with data related to problems with the fluid and fluid flow, operational integrity of mechanical systems associated with the fluid flow, control systems, and other such data including well head measurement, blending and/or feed stock control, and other measurement data. The acquired fluid parameter data can be compared to known parameters to make determinations regarding problems with the fluid and fluid flow, operational integrity of mechanical systems associated with the fluid flow, and other such data. The known parameters can include known or calculated ranges, which can be determined by the user in one or more embodiments.

The fluid measuring device can provide users with early leak and spill detection, thereby preventing problems at the input and output of a flow pipe or production well. The fluid measuring device can be used to detect phase changes between liquid and gas and flashing of products, providing an early indication of hazardous conditions.

The fluid measuring device can provide fiscal accountability and reduce or eliminate the occurrence of lawsuits between oil and gas suppliers and users by providing accurate sensor readings by having a fixed geometry conical section mount centered and aligned within the fluid measuring device. The fluid measuring device can be used to resolve government royalty disputes with producers, land owners, and the Bureau of Land Management.

The fluid measuring device can be used to increase efficiency of costly compressors by monitoring fuel consumption against the output of the compressors.

The fluid measuring device can be used to monitor well production to ensure oil/water/gas ratios. The fluid measuring device can be used to monitor well injection to ensure that non-productive wells are closed off.

The fluid measuring device can be made of steel, carbon steel, a Hastolloy material, exotic stainless steel, stainless steel, other materials, or combinations thereof.

The fluid measuring device can have a hollow body for receiving and emitting flowing fluid. The hollow body can have an exterior surface, an interior surface, and a chamber. The chamber can have a first diameter. In one or more embodiments the hollow body can be substantially cylindrical, with the chamber extending from a first end of the hollow body to a second end of the hollow body.

One or more portions of the hollow body can have beveled surfaces, allowing the hollow body to be easily attached to and/or installed onto pipes, piping, flow conduits, or the like. The beveled surfaces can allow the hollow body to be installed on a range of different standard pipe sizes or schedule, providing a versatile apparatus. For example, the hollow body can be attached to a first flow pipe, such as an upstream pipe, at one end, and to a second flow pipe, such as a downstream pipe, at another end. The fluid measuring device can be mounted inline with the flow pipes. The fluid measuring device can include one or more flat faces that can be disposed or formed on each beveled surface for engagement with each pipe. In one or more embodiments, the fluid measuring device can be connected with flow pipes by welding, flanges, or other conventional means.

The interior surface of the hollow body can have a surface finish that can be configured to conform to tight tolerances to ensure highly repeatable performance of the fluid measuring device. In one or more embodiments, the fluid measurement device can be configured to be connected with flanges, such as 150 ANSI to 1500 ANSI flanges. In one or more embodiments, the fluid measurement device can have wafer ends to fit between flanges or threaded ends to engage threaded conduits. The fluid measurement device can be welded, bolted, screwed, or pipe hammered to flow pipes.

In one or more embodiments, one or more portions of the fluid measuring device, such as the hollow body, can be made using an investment casting process within tight tolerances, thereby eliminating eccentricities that can impact the accuracy of acquired data, as well as easing the installation process of the fluid measuring device.

The fluid measuring device can include a sensor mount on the hollow body, and a conical section mount with a support member within the hollow body. In one or more embodiments, the hollow body, conical section mount, support member, and sensor mount can be cast as a single unit. The single unit can support the conical section mount at an optimal location at a center of the hollow body, provide a rigid stable mounting platform for mounting and stabilizing sensors and measurement instruments to the sensor mount to monitor and record flow data, provide a mass and rigidity to eliminate movement or flexing of the conical section mount and support member due to forces of fluid flow, and stabilize the conical section mount, particularly in the axial direction of the fluid flow. As such, the support member and the conical section mount can be formed at a correct, aligned, and concentric location.

The sensor mount can be connected to or formed on the hollow body, such as on the exterior surface of the hollow body. The sensor port can be an integrated multiport manifold connection. The sensor mount can be flush mounted to the exterior surface of the hollow body. The sensor mount can provide a stable instrument platform, allowing instrumentation to monitor and record measurement data without interference. The sensor mount can include a plurality of ports or tapered bores, including an upstream pressure port, a downstream pressure port, a temperature port, and a downstream diagnostic port. One or more of the ports can extend into the chamber or can be in fluid communication with the chamber. Sensors and other measurement instruments can be attached to the fluid measuring device through the ports. The sensors and other measurement instruments can include barometers, thermometers, and other such measurement devices. As such, the fluid measuring device can measure preselected parameters of the fluid in the flow pipe, such as pressure differentials, temperatures, flow rates, diagnostics, and other parameters. In one or more embodiments, the ports can be tapped or machined ports.

In one or more embodiments, the upstream pressure port can be precision machined through the sensor mount and can penetrate the interior surface of the hollow body to sense and record high pressures at the interior surface of the hollow body upstream from the conical section mount.

The downstream pressure port can be precision machined through the sensor mount and the support member within the hollow body to allow sensing of a downstream low pressure at a face of the conical section mount in a center of a flowing fluid stream within the chamber. The downstream pressure port can be in fluid communication with a bore within the conical section mount, and the bore within the conical section mount can be in fluid communication with the chamber. As such, the low pressure stream can be sensed and recorded at an optimal point at the center of the flowing stream at a downstream face of the conical section mount.

The temperature sensor port can be precision machined into the sensor mount and the support member. The temperature sensor port can extend into the support member for sensing a temperature of the support member. The temperature of the support member, as sensed by a temperature sensor in the temperature sensor port, can represent a temperature of the fluid at the conical section mount. As such, the temperature sensor port can allow for real-time monitoring of temperatures of the fluid near the center of the hollow body that corresponds to the pressure data simultaneously obtained from the pressure sensors. The temperature sensor can measure temperatures without being exposed to the fluid or disturbing the flow patterns of the fluid. In one or more embodiments, a heat conducting fluid can be disposed within the temperature sensor port and can be in contact with the temperature sensor to provide for enhanced heat transfer.

The diagnostic port can be machined through the sensor mount and the interior surface of the hollow body. The diagnostic port can be in fluid communication with the chamber downstream from the conical section mount. The diagnostic port can provide for diagnostic or additional measurements to be taken without contaminating the primary measurements taken by the other sensors or measurement instruments. In one or more embodiments, each of the ports can be attached to sensors and other measurement instrumentation by threading, socket welding, or the like.

In one or more embodiments, the flow measuring device can include additional ports to monitor other parameters, such as mass and viscosity.

In one or more embodiments, the sensor mount can include a first mounting section top that can be substantially parallel to a fluid flow within the hollow body, a second mounting section top that can be substantially parallel to the fluid flow, and an angled top mounting section that can be formed or disposed between the first mounting section top and the second mounting section top at an angle, such as at an angle from about twenty degrees to about sixty degrees.

The fluid measuring device can include the support member, which can be a mounting arm with an integrated stabilizer that can be integral with the hollow body. The support member can be disposed within the hollow body and can extend from the interior surface of the hollow body. In one or more embodiments, the support member can extend into the chamber and can substantially block the fluid flow into the chamber. The support member can be cast, cast metal, rigid in design, solid, non-removable from the inside of the chamber, rigid within the chamber, or combinations thereof.

The support member can include or be integral with the conical section mount, which can be concentrically located within the chamber. The conical section mount can connect to the support member within the chamber, such that the conical section mount is centered within the chamber and aligned along a central axis of the chamber. The conical section mount can include one or more mounting surfaces, which can be mounting recesses with alignment surfaces. For example, the conical section mount can include a first mounting surface, a second mounting surface, and a third mounting surface. The conical section mount can be machine centered into the chamber. In one or more embodiments, the mounting surfaces can be machined to conform to desired tolerances.

In one or more embodiments, the conical section mount can include a front face, a flat edge on the front face, and a first diameter chamber that can be integrally connected to a bore within the conical section mount. The bore, which can be a threaded bore, can have a smaller diameter than the first diameter chamber. The conical section mount can include a beveled face that can be integral with the flat edge and can extend therefrom. The conical section mount can include a first mating surface, a second mating surface that can extend away from the first mating surface, a third mating surface that can be formed at a ninety degree angle to the second mating surface, a fourth mating surface that can extend at a ninety degree angle to the third mating surface, and a fifth mating surface that can form a flat face and can extend at a ninety degree angle from the fourth mating surface. In one or more embodiments, the conical section mount can include a beveled fourth mounting surface.

One or more embodiments of the fluid measuring device can include an area ratio changer (ARC). The area ratio changer can be detachable from the fluid measuring device and re-attachable to the fluid measuring device. For example, the area ratio changer can be detachably mounted to the mounting surfaces of the conical section mount, such as to the first mounting surface, the second mounting surface, and the third mounting surface. The area ratio changer can be mounted in a coaxial and concentric orientation with respect to the hollow body and the chamber. The mounting surfaces can allow the area ratio changer to be mounted thereto, such that the area ratio changer self-aligns and self-centers within the chamber. A seal can be disposed between the first mounting surface and the area ratio changer, such as an o-ring, gasket, or another elastomeric and compressible material, which can prevent contamination of downstream pressure measurements. The detachable and re-attachable configuration of the area ratio changer can allow the support member and the conical section mount to remain centered and aligned within the hollow body upon replacement of the area ratio changer.

In one or more embodiments, a hollow fastener can secure the area ratio changer to the conical section mount. The area ratio changer can have a central bore, which can be aligned with the bore within the conical section mount. The hollow fastener can secure through the central bore and with the bore, thereby attaching and securing the area ratio changer to the conical section mount. The hole of the hollow fastener can be in fluid communication with the bore and with the downstream pressure port, allowing pressure of the fluid to be measured.

In one or more embodiments, the area ratio changer can be mounted using a handle hex head wrench. An end of the wrench can be placed into a hex opening on the hollow fastener. The area ratio changer can be inserted into a downstream end of the fluid measuring device while supported by the wrench. The hollow fastener can be screwed into the threaded bore in the conical section mount and tightened thereto. The area ratio changer can be centered in the chamber of the hollow body and firmly attached to the conical section mount via the hollow fastener and a lock washer on the hollow fastener. The hollow fastener can provide for self alignment and self centered attachment of the area ratio changer through the conical section mount to the support member. As such, transmission of pressure to the downstream port can be allowed, and installation of the area ratio changer can be easily performed.

One or more embodiments of the area ratio changer can have flat exterior surfaces, thereby reducing wear of the area ratio changer and promoting unhindered fluid flow.

In one or more embodiments, the area ratio changer can be variable to be larger or smaller in size to change a size of the conical mount section. As such, a volume of the fluid flow can be changed by increasing or decreasing a fluid restriction caused by the conical section mount.

In one or more embodiments, the area ratio changer can include an anti-rotation assembly disposed thereon, which can prevent rotation of the area ratio changer with respect to the conical section mount. The downstream pressure port can connect to the bore within the conical section mount. The bore can contain the hollow fastener. The bore can be a threaded bore, a tapped bore, a machined bore, or combinations thereof. The bore can be machine centered through the conical section mount to the support member.

Figure 1:
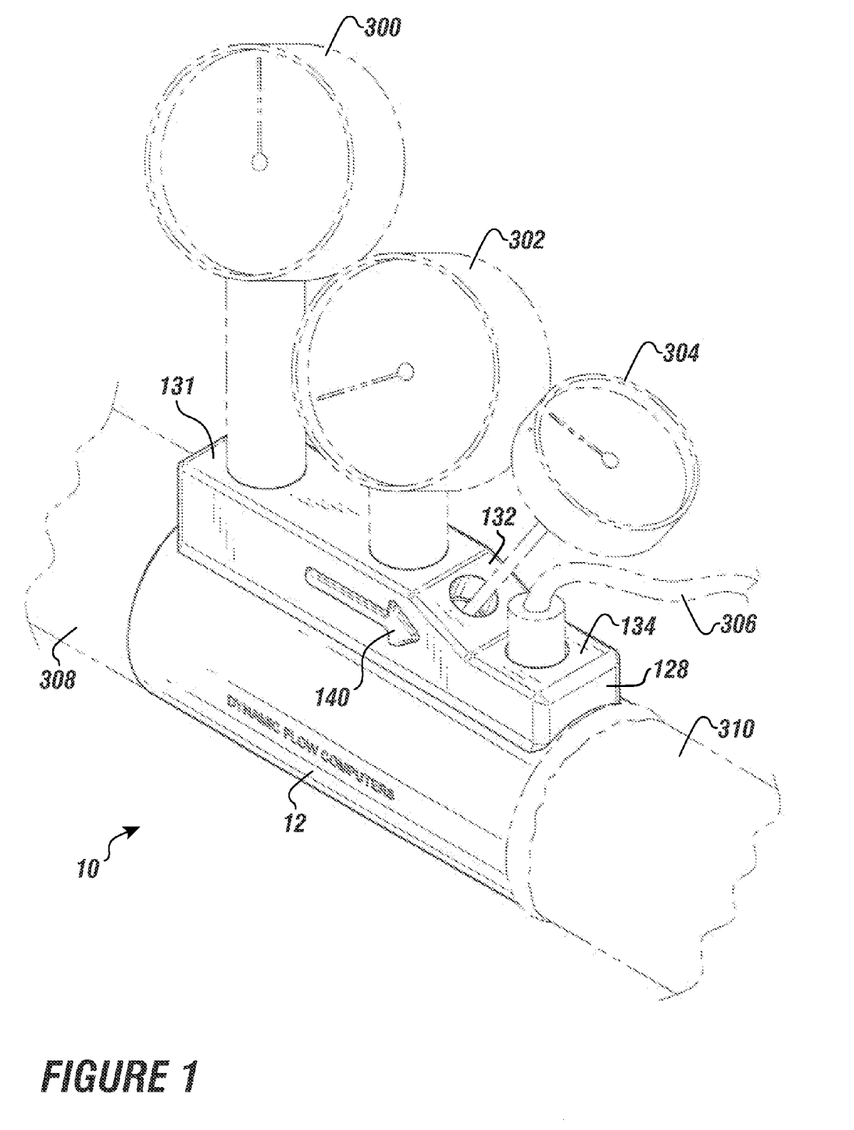
FIG. 1 depicts a perspective view of the fluid measuring device attached to upstream and downstream flow pipes.

Turning now to the Figures, FIG. 1 depicts a perspective view of the fluid measuring device 10 having a hollow body 12 attached inline with a flow pipe having a first flow pipe 308 and a second flow pipe 310.

The fluid measuring device 10 can include a first pressure sensor 300, which can be an upstream pressure sensor and/or a high pressure sensor.

The fluid measuring device 10 can include a second pressure sensor 302, which can be a downstream pressure sensor and/or a low pressure sensor.

The fluid measuring device 10 can include a temperature sensor 304, which can be an integral part of the fluid measuring device 10 rather than a separate sensor installed downstream on the flow pipe. As such, users can acquire more accurate temperature readings because the temperature readings can be taken at the same time and at or proximate the same position as the measurements taken by the other sensors and measurement instruments.

The fluid measuring device 10 can include a diagnostic sensor 306, such as a downstream pressure diagnostic sensor. The diagnostic sensor 306 can provide an early indication or warning of potential problems, such as when the measured data is outside of known or calculated ranges.

Also depicted is the first mounting section top 131, the second mounting section top 134, the angled top mounting section 132, the third mounting section 128, and the flow indicator 140. The flow indicator can indicate the direction of fluid flow within the fluid measuring device 10.

Figure 2:
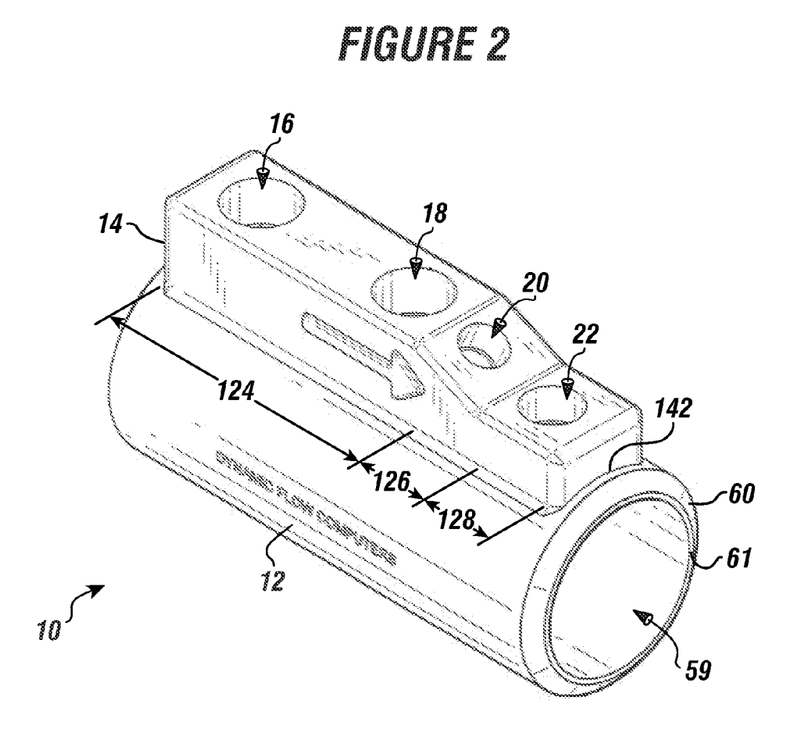
FIG. 2 depicts a perspective view of the fluid measuring device.

FIG. 2 depicts a perspective view of the fluid measuring device 10 having a hollow body 12 with a beveled surface 60 and a flat face 61.

The fluid measuring device 10 can also have a sensor mount 14 for mounting various sensors and measurement instruments, such as those depicted in FIG. 1. The sensor mount 14 can include a first port 16, a second port 18, a third port 20, and a fourth port 22.

For example, the first port 16 can be an upstream pressure sensor port through which the first pressure sensor (element 300 depicted in FIG. 1) can be disposed. The first port 16 can extend through the sensor mount 14 to the interior surface of the hollow body 12, and can be in fluid communication with the chamber 59.

The second port 18 can be a downstream pressure sensor port through which the second pressure sensor (element 302 depicted in FIG. 1) can be disposed. The second port 18 can be in fluid communication with a bore within the conical section mount.

The third port 20 can be a temperature sensor port through which the temperature sensor (element 304 depicted in FIG. 1) can be disposed.

The fourth port 22 can be a diagnostic sensor port through which the diagnostic sensor (element 306 depicted in FIG. 1) can be disposed. The fourth port 22 can extend through the sensor mount 14 to the interior surface of the hollow body 12, and can be in fluid communication with the chamber 59.

The fluid measuring device 10 can have a first segment mounting section 124, a second segment mounting section 126, and a third segment mounting section 128. The sensor mount 14 can have a curved bottom edge 142. The sensor mount 14 can be on the hollow body 12 such that the hollow body 12 extends past both ends of the sensor mount 14. As such, the fluid measuring device 10 can be connected with adjacent pipes without interference by the sensor mount 14.

Figure 3:
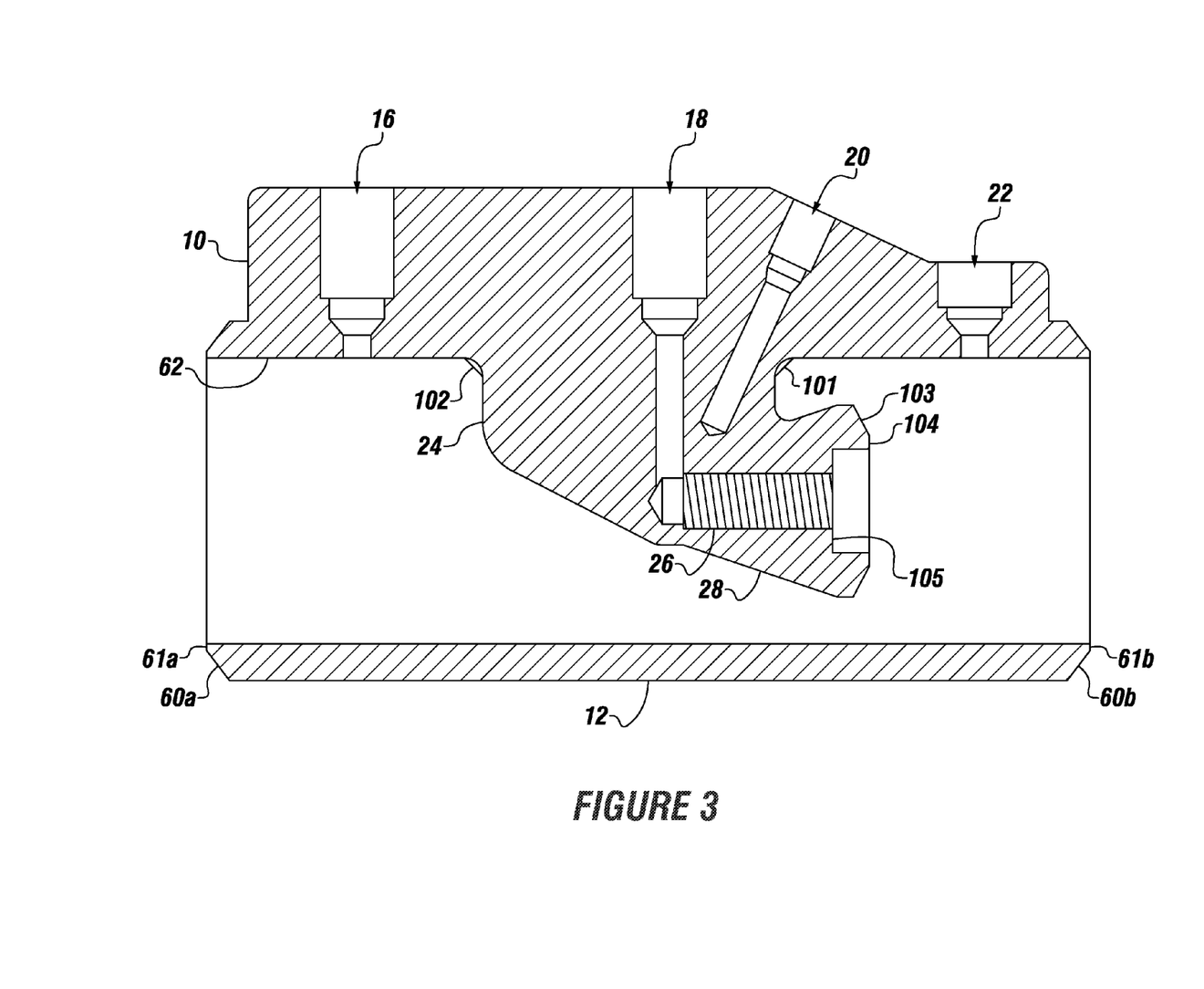
FIG. 3 depicts a cut side view of the fluid measuring device.

FIG. 3 depicts a cut side view of the fluid measuring device 10 with the hollow body 12 having a first beveled surface 60*a*, a second beveled surface 60*b*, a first flat face 61*a*, and a second flat face 61*b*. The first beveled surface 60*a* can be located at a first end of the hollow body 12 and can be configured to connect inline with an upstream conduit. The second beveled surface 60*b* can be located at a second end of the hollow body 12 and can be configured to connect inline with a downstream conduit. The hollow body 12 is shown having an interior surface 62.

The fluid measuring device 10 can have a support member 24, which can be positioned accurately and in a stable manner within the fluid measuring device 10 to ensure accuracy of the pressure readings taken within the second port 18. The support member 24 can be or can include an L-shaped mounting arm that can extend into the chamber from the interior surface 62. The support member 24 can include a conical section mount 28 that can be positioned such that a vertical tip and base of the conical section mount 28 is centered and coaxial within the hollow body 12 along the direction of the fluid flow therein. As the support member 24 and the conical section mount 28 can be an integral structure, the fluid measuring device 10 can reduce potential data errors that can occur when the conical section mount 28 is connected via welds or fasteners to the support member 24, as such connections can deteriorate and can result in an eccentric positioning of support members and/or conical section mounts. As such, concentric consistency can be maintained between the support member 24, the conical section mount 28, and the hollow body 12.

The conical section mount 28 can include partially recessed mounting surfaces, such as the first mounting surface 103, the second mounting surface 104, and the third mounting surface 105.

The conical section mount 28 can also include a threaded bore 26, a first strength angle 101, and a second strength angle 102.

The first port 16 and the fourth port 22 are shown extending such that each is flush with the interior surface 62 and in fluid communication therewith. Also depicted is the third port 20, which can extend into the conical section mount 28.

Figure 4:
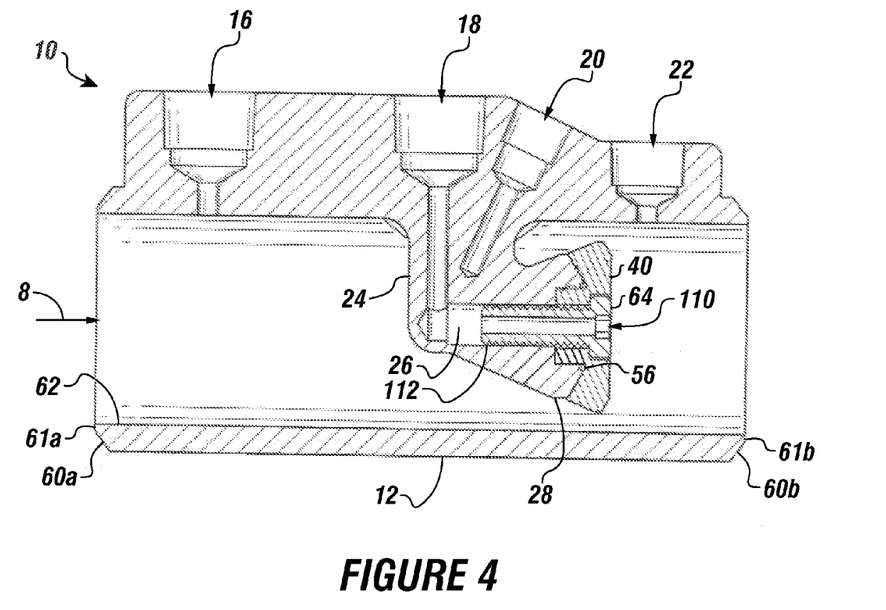
FIG. 4 depicts another cut side view of the fluid measuring device.

FIG. 4 depicts another cut side view of the fluid measuring device 10. The direction of the fluid 8 flowing within the fluid measuring device 10 can be seen.

A hollow fastener 64 with a hole 110 and threads 112 can be disposed within the threaded bore 26 of the conical section mount 28. The hollow fastener 64 can secure an area ratio changer 40 to the conical section mount 28. The threaded bore 26 and/or the hole 110 of the hollow fastener 64 can act as a tunnel for transmission of the fluid 8 to the second port 18. The threaded bore 26 can be precision machined to connect with the second port 18 and be in fluid communication with both the second port 18 and the chamber of the hollow body 12. The second port 18 can be in fluid communication with the hole 110 through the threaded bore 26. As such, sensing of the downstream pressure can occur at the optimal location at the center of the flowing fluid and downstream from the face of the conical section mount 28.

The combination of the area ratio changer 40 and the hollow fastener 64 can form a fluid flow stabilizer. In operation, the area ratio changer 40 can change a measurement area ratio of the fluid measuring device 10. As such, the area ratio changer 40 can have a wide range of dimensions according to the particular application and user requirements, thereby accommodating a wide range of flow rates.

The fluid measuring device 10 can include a seal 56, such as an O-ring or a gasket, which can be disposed between the conical section mount 28 and the area ratio changer 40 to prevent leakages.

Also depicted are the first port 16, the third port 20, the fourth port 22, the interior surface 62, the support member 24, the first beveled surface 60*a*, the second beveled surface 60*b*, the first flat face 61*a*, and the second flat face 61*b*.

Figure 5A:
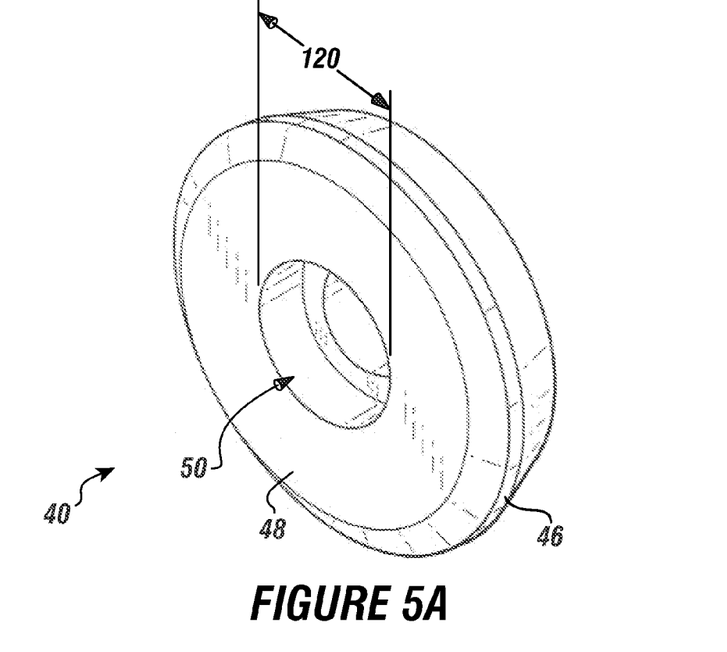
FIG. 5A depicts a front perspective view of an area ratio changer of the fluid measuring device.

FIG. 5A depicts a front perspective view of the area ratio changer 40 of the fluid measuring device.

In one or more embodiments, the area ratio changer 40 can be a substantially frustoconical annular disc with a central bore 50 disposed therethrough. In operation, the central bore 50 can receive the hollow fastener (element 64 depicted in FIG. 4). The central bore 50 can receive the hollow fastener in a flush configuration for securing the area ratio changer 40 onto the conical section mount.

In one or more embodiments, the area ratio changer 40 can terminate in a flat edge 46 that can be disposed parallel to the interior surface (element 62 depicted in FIGS. 3 and 4). The flat edge 46 can be machined to maintain concentricity of the area ratio changer 40 with respect to the interior surface of the hollow body. In one or more embodiments, an axial dimension of the flat edge 46 can be optimized as a function of flow range, including operating conditions and the interior surface. Due to the flat configuration of the flat edge 46, wear can be reduced, thereby maintaining the accuracy of the data acquired. The area ratio changer 40 can also have a front face 48.

The area ratio changer 40 can have a first diameter passage 120 within which a head of the hollow fastener can engage.

Figure 5B:
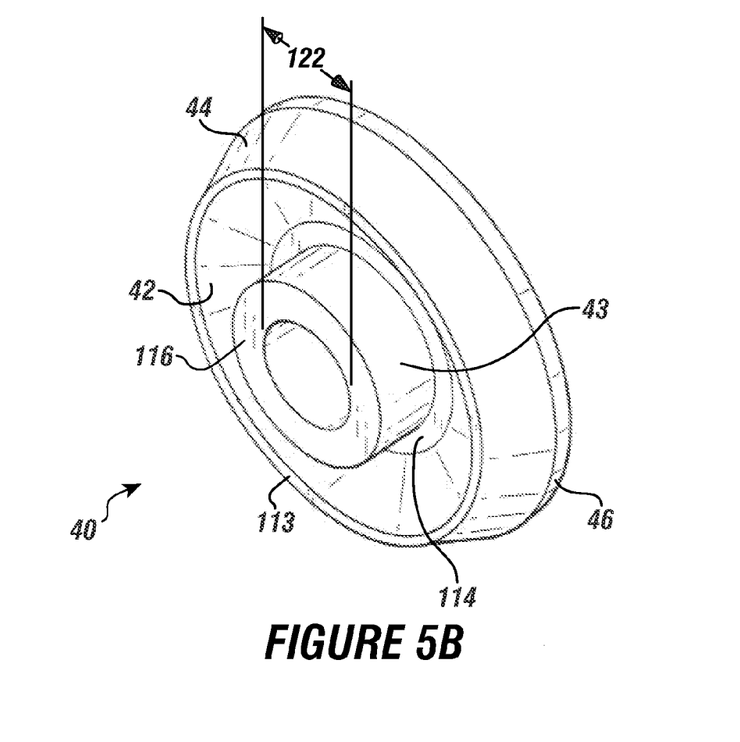
FIG. 5B depicts a rear perspective view of the area ratio changer of the fluid measuring device.

FIG. 5B depicts a rear perspective view of the area ratio changer 40 of the fluid measuring device.

The area ratio changer 40 can have a mating surface, such as the first mating surface 113, the second mating surface 42, the third mating surface 114, the fourth mating surface 43, and the fifth mating surface 116. The second mating surface 42 can correspond to the mounting surfaces of the conical section mount, allowing for self-aligned and self-centered installment of the area ratio changer 40 thereto. The second mating surface 42 and the mounting surfaces of the conical section mount can be formed with tight tolerances to maintain concentric consistency.

The area ratio changer 40 can have a beveled face 44 that can match a sloped surface of the conical section mount to provide obstruction to the flow stabilizer.

The area ratio changer 40 can have a second diameter passage 122 within which a body of the hollow fastener can engage.

Figure 6A:
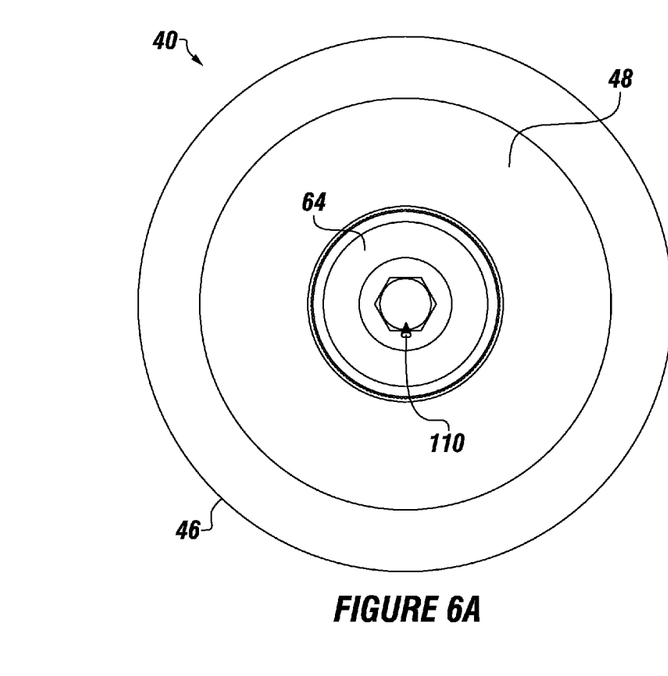
FIG. 6A depicts a front view of the area ratio changer of the fluid measuring device with a hollow fastener.

FIG. 6A depicts a front view of the area ratio changer 40 of the fluid measuring device with a hollow fastener 64 connected thereto. The hole 110 of the hollow fastener 64 is depicted. Also depicted are the flat edge 46 and the front face 48.

Figure 6B:
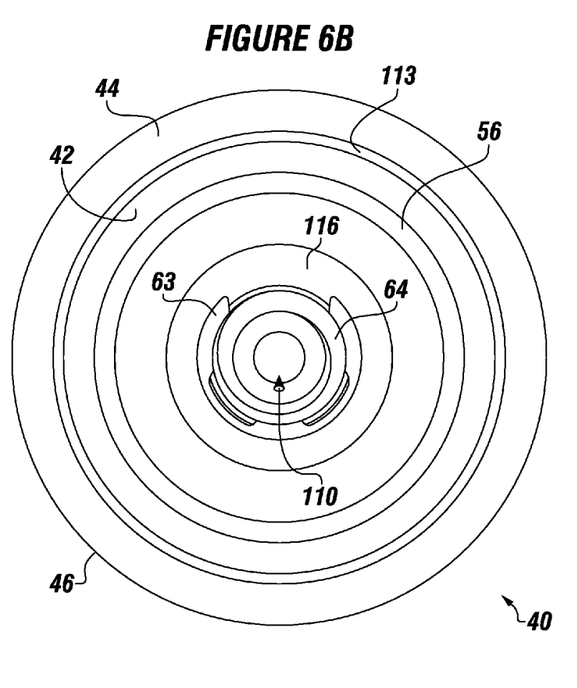
FIG. 6B depicts a rear view of the area ratio changer of the fluid measuring device with a hollow fastener.

FIG. 6B depicts a rear view of the area ratio changer 40 of the fluid measuring device with a hollow fastener 64 connected thereto.

The fluid measuring device can include an anti-rotation assembly between conical section mount and the area ratio changer 40 to prevent any potential free rotation of the area ratio changer 40. The anti-rotation assembly can include a lock washer 63 engaged with the hollow fastener 64. The lock washer 63 can secure the hollow fastener 64 to the area ratio changer 40.

Also depicted are the hole 110, the first mating surface 113, the second mating surface 42, the fifth mating surface 116, the flat edge 46, the beveled face 44, and the seal 56.

Figure 7:
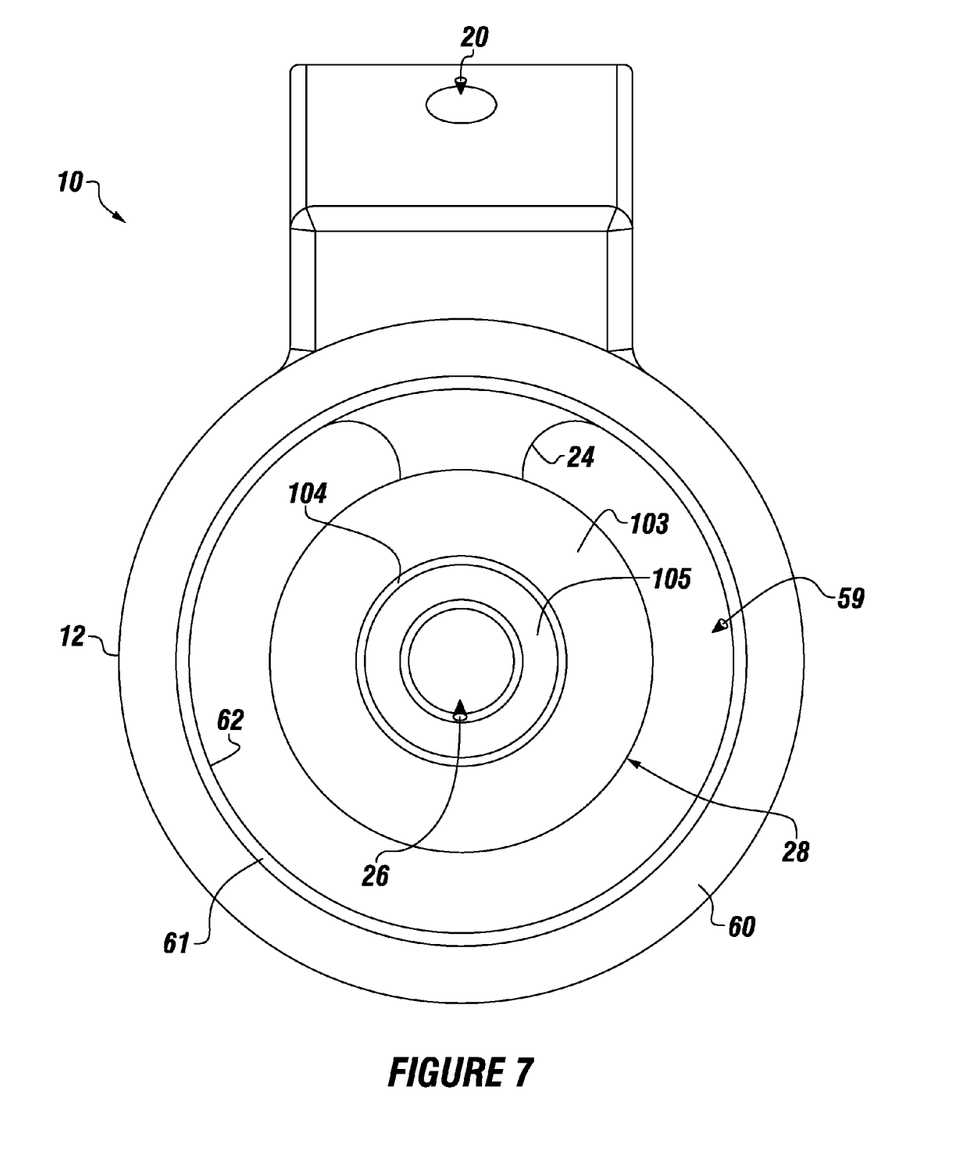
FIG. 7 depicts an end view of the fluid measuring device.

FIG. 7 depicts an end view of the fluid measuring device 10 with the hollow body 12, the third port 20, the first mating surface 103, the second mating surface 104, the third mating surface 105, the threaded bore 26, the flat face 61, and the beveled surface 60.

The support member 24 is depicted extending from a top of the interior surface 62. The conical section mount 28 is depicted centered within the chamber 59, connected to the support member 24, and disposed above a bottom portion of the interior surface 62.

While these embodiments have been described with emphasis on the embodiments, it should be understood that within the scope of the appended claims, the embodiments might be practiced other than as specifically described herein.

What is claimed is:

1. A fluid measuring device comprising:
   a. a hollow body for receiving and emitting a fluid, the hollow body comprising:
      (i) an exterior surface, an interior surface, and a chamber with a first diameter within the hollow body;
      (ii) a first beveled surface at a first end of the hollow body configured to connect inline with an upstream conduit; and
      (iii) a second beveled surface at a second end of the hollow body configured to connect inline with a downstream conduit;
   b. a conical section mount and a support member in the hollow body, wherein the conical section mount is concentrically disposed within the hollow body, and wherein the conical section mount comprises mounting surfaces;
   c. a sensor mount flush on the exterior surface comprising:
      (i) an upstream pressure port extending into the chamber proximate the first end of the hollow body;
      (ii) a downstream pressure port extending into the support member downstream from the upstream pressure port;
      (iii) a temperature port extending into the support member for sensing a temperature of the support member representing a temperature of the fluid at the conical section mount; and
      (iv) a downstream diagnostic port extending into the chamber proximate the second end of the hollow body;
   d. a detachable and re-attachable conical area ratio changer connected to the mounting surfaces of the conical mount section, wherein the detachable and re-attachable conical area ratio changer comprises a central bore;
   e. a bore in the conical section mount and in communication with the downstream pressure port; and
   f. a hollow fastener disposed through the central bore and the bore, wherein the hollow fastener is configured to align and center the detachable and re-attachable conical area ratio changer to the conical section mount and the support member.

2. The fluid measuring device of claim 1, wherein the hollow body is substantially cylindrical, wherein conical section mount is machine centered into the chamber, and wherein the bore is machine centered through the conical section mount to the support member.

3. The fluid measuring device of claim 1, further comprising a lock washer securing the hollow fastener to the detachable and re-attachable conical area ratio changer.

4. A fluid measuring device comprising:
   a. a hollow body comprising:
      (i) an exterior surface, an interior surface, and a chamber within the hollow body;
      (ii) a first end configured to connect inline with an upstream conduit; and
      (iii) a second end configured to connect inline with a downstream conduit;
   b. a support member extending from the interior surface of the hollow body into the chamber and connected to a conical section mount concentrically disposed within the chamber;
   c. a sensor mount on the exterior surface comprising:
      (i) an upstream pressure port extending into the chamber proximate the first end of the hollow body for receiving an upstream pressure sensor; and
      (ii) a downstream pressure port extending into the support member and connected to a bore in the conical section mount for receiving a downstream pressure sensor, wherein the hollow body, the sensor mount, the conical section mount, and the support member are a single piece unit.

5. The fluid measuring device of claim 4, wherein the sensor mount further comprises:
   a. a temperature port for receiving a temperature sensor, wherein the temperature port extends into the support member for sensing a temperature of the support member; and
   b. a downstream diagnostic port extending into the chamber proximate the second end of the hollow body.

6. The fluid measuring device of claim 5, wherein the sensor mount further comprises additional ports for monitoring mass, viscosity, and other parameters.

7. The fluid measuring device of claim 5, wherein the upstream pressure port is disposed through the sensor mount and penetrates the interior surface of the hollow body to sense and record high pressure at the interior surface of the hollow body upstream from the conical section mount.

8. The fluid measuring device of claim 4, further comprising:
   a. a first mounting surface, a second mounting surface, and a third mounting surface on the conical section mount;
   b. a detachable and re-attachable area ratio changer connected to the first mounting surface, the second mounting surface, and the third mounting surface of the conical section mount, wherein the detachable and re-attachable area ratio changer comprises a central bore; and
   c. a hollow fastener disposed through the central bore and the bore, wherein the hollow fastener is configured to align and center the detachable and re-attachable area ratio changer with the conical section mount.

9. The fluid measuring device of claim 8, wherein the detachable and re-attachable area ratio changer is a substantially frustoconical annular disc comprising flat exterior surfaces to reduce wear of the detachable and re-attachable area ratio changer and promote unhindered fluid flow.

10. The fluid measuring device of claim 8, further comprising a seal disposed between the detachable and re-attachable area ratio changer and the conical section mount.

11. The fluid measuring device of claim 8, further comprising a lock washer securing the hollow fastener to the detachable and re-attachable conical area ratio changer.

12. The fluid measuring device of claim 8, wherein the detachable and re-attachable area ratio changer is variable to be larger or smaller in size to change a size of the conical mount section for changing a volume of fluid flow by increasing or decreasing a fluid restriction caused by the conical section mount.

13. The fluid measuring device of claim 4, wherein the hollow body, the conical section mount, and the support member are a single piece unit of cast metal.

14. The fluid measuring device of claim 4, wherein the support member extends into the chamber and substantially blocks fluid flow into the chamber.

15. The fluid measuring device of claim 4, wherein a portion of the hollow body comprises beveled surfaces for ease of installation into the upstream conduit and the downstream conduit, and wherein a flat face is disposed on each beveled surface for engagement with the upstream conduit and the downstream conduit.

16. The fluid measuring device of claim 4, wherein the conical section mount is machine centered into the chamber, and wherein the bore is machine centered through the conical section mount to the downstream pressure port in the support member.

17. The fluid measuring device of claim 4, wherein the conical section mount comprises:
   a. a front face;
   b. a flat edge on the front face;
   c. a first diameter chamber;
   d. a beveled face integral with the flat edge and extending therefrom;
   e. a first mating surface;
   f. a second mating surface extending away from the first mating surface;
   g. a third mating surface formed at a ninety degree angle to the second mating surface;
   h. a fourth mating surface extending at a ninety degree angle to the third mating surface; and
   i. a fifth mating surface forming a flat face and extending at a ninety degree angle from the fourth mating surface.

18. The fluid measuring device of claim 4, wherein the sensor mount further comprises:
   a. a first mounting section top substantially parallel to a fluid flow within the hollow body;
   b. a third mounting section top substantially parallel to the fluid flow; and
   c. an angled top second mounting section between the first mounting section and the second mounting section at an angle from twenty degrees to sixty degrees.

19. A fluid measuring device comprising:
   a. a hollow body comprising:
      (i) an exterior surface, an interior surface, and a chamber within the hollow body;
      (ii) a first end configured to connect inline with an upstream conduit; and
      (iii) a second end configured to connect inline with a downstream conduit;
   b. a support member extending from the interior surface of the hollow body into the chamber and connected to a conical section mount, wherein the conical section mount is concentrically disposed within the chamber, and wherein the conical section mount comprises a bore; and
   c. a sensor mount on the exterior surface comprising:
      (i) an upstream pressure port in fluid communication with the chamber proximate the first end of the hollow body for receiving an upstream pressure sensor;
      (ii) a downstream pressure port extending into the support member and in communication with the bore in the conical section mount for receiving a downstream pressure sensor; and
      (iii) a temperature port for receiving a temperature sensor, wherein the temperature port extends into the support member for sensing a temperature of the support member, wherein the hollow body, the sensor mount, the conical section mount, and the support member are a single piece unit.

20. The fluid measuring device of claim 19, further comprising:
   a. a detachable and re-attachable area ratio changer comprising a central bore;
   b. a mounting surface on the conical section mount, wherein at least a portion of the detachable and re-attachable area ratio changer is engaged with the mounting surface; and
   c. a hollow fastener disposed through the central bore and the bore securing the detachable and re-attachable area ratio changer to the conical section mount.

* * * * *